United States Patent
Park et al.

(10) Patent No.: US 11,496,658 B2
(45) Date of Patent: Nov. 8, 2022

(54) LIGHT-EMITTING MODULE AND CAMERA MODULE

(71) Applicant: LG INNOTEK CO., LTD., Seoul (KR)

(72) Inventors: Kang Yeol Park, Seoul (KR); Hee Se Lee, Seoul (KR); Sung Phil Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 88 days.

(21) Appl. No.: 17/267,675

(22) PCT Filed: Sep. 11, 2019

(86) PCT No.: PCT/KR2019/011826
§ 371 (c)(1),
(2) Date: Feb. 10, 2021

(87) PCT Pub. No.: WO2020/055160
PCT Pub. Date: Mar. 19, 2020

(65) Prior Publication Data
US 2021/0160408 A1 May 27, 2021

(30) Foreign Application Priority Data

Sep. 13, 2018 (KR) ........................ 10-2018-0109796

(51) Int. Cl.
*H04N 5/225* (2006.01)
*F21V 5/04* (2006.01)
*F21V 33/00* (2006.01)

(52) U.S. Cl.
CPC ........... *H04N 5/2256* (2013.01); *F21V 5/045* (2013.01); *F21V 33/0052* (2013.01); *H04N 5/2254* (2013.01)

(58) Field of Classification Search
CPC .. H04N 5/2256; H04N 5/2254; H04N 5/2257; H04M 1/0264; H04M 1/22;
(Continued)

(56) References Cited

U.S. PATENT DOCUMENTS

2007/0041722 A1* 2/2007 Fong .................. G03B 15/06
396/176
2009/0052037 A1 2/2009 Wernersson
(Continued)

FOREIGN PATENT DOCUMENTS

| CN | 207382424 U | 5/2018 |
| KR | 10-2011-0106148 A | 9/2011 |

(Continued)

OTHER PUBLICATIONS

International Search Report dated Jan. 31, 2020 in International Application No. PCT/KR2019/011826.
(Continued)

*Primary Examiner* — Lin Ye
*Assistant Examiner* — John H Morehead, III
(74) *Attorney, Agent, or Firm* — Saliwanchik, Lloyd & Eisenschenk

(57) ABSTRACT

The present embodiment relates to a light-emitting module comprising: a substrate; a light source which is arranged on the substrate and emits laser light; a holder arranged on the substrate; a diffuser lens arranged in the holder and over the light source; and a diffuser ring for supporting the diffuser lens, wherein the diffuser lens comprises a plurality of microlenses, and the holder comprises an opening formed above the diffuser lens and a stopping protrusion for inhibiting the diffuser lens from being separated through the opening.

20 Claims, 9 Drawing Sheets

(58) Field of Classification Search
CPC ...... F21V 5/045; F21V 33/0052; F21V 5/004; F21S 2/005
See application file for complete search history.

(56) References Cited

U.S. PATENT DOCUMENTS

2017/0374355 A1   12/2017  Ko et al.
2020/0355987 A1*  11/2020  Chen ...................... G03B 15/05
2020/0412919 A1*  12/2020  Matikainen .......... H04N 5/2253

FOREIGN PATENT DOCUMENTS

KR   10-2015-0042631 A    4/2015
KR   10-2017-0139982 A   12/2017
KR   10-2017-0142754 A   12/2017

OTHER PUBLICATIONS

Supplementary European Search Report dated Sep. 10, 2021 in European Application No. 19859745.2.

* cited by examiner

LIGHT-EMITTING MODULE AND CAMERA MODULE

CROSS-REFERENCE TO RELATED APPLICATIONS

This application is the U.S. national stage application of International Patent Application No. PCT/KR2019/011826, filed Sep. 11, 2019, which claims the benefit under 35 U.S.C. § 119 of Korean Application No. 10-2018-0109796, filed Sep. 13, 2018, the disclosures of each of which are incorporated herein by reference in their entirety.

TECHNICAL FIELD

The present embodiment relates to a light emitting module and a camera module.

BACKGROUND ART

Recent smartphones are used to perform functions requiring security. Therefore, there is a trend of employing a higher level of security measures for smart phones.

Conventionally, a security means using a password or a pattern of a specific shape has been used, but in recent years, a security means using fingerprint recognition is widely spread.

Furthermore, research on a security means using iris recognition is in progress. Since the iris has more complex unique patterns than fingerprints, it is less likely to be forged than fingerprints and thus has high security. In addition, fingerprint recognition has a disadvantage in that it is impossible to recognize if you are wearing gloves or if there is a foreign substance on the fingerprint because the surface of the fingerprint must be in direct contact with the sensor surface, however, iris recognition which is a non-contact method has an advantage in that recognition is possible even when wearing glasses or contact lenses. Facial recognition also has the same advantages as iris cognition.

However, mounting a separate device other than a camera for iris recognition and facial recognition is a factor that increases the unit price, and it is a factor that hinders making smartphones light, thin, short, and small, so camera modules for iris recognition and facial recognition are not widely used.

DETAILED DESCRIPTION OF THE INVENTION

Technical Subject

The present embodiment is intended to provide a light emitting module having a low shoulder height suitable for making a smart phone light, thin, short and small.

Further, the present invention is intended to provide a light emitting module in which a diffuser lens is inhibited from being separated upward by comprising a structure in which the diffuser lens is coupled by being inserted from the lower side of the holder.

It is intended to provide a camera module comprising the light emitting module and a light receiving module for sensing light emitted from the light emitting module.

Technical Solution

A light emitting module according to the present embodiment comprises: a substrate; a light source which is disposed on the substrate and emits laser light; a holder disposed on the substrate; a diffuser lens disposed in the holder and over the light source; and a diffuser ring for supporting the diffuser lens, wherein the diffuser lens comprises a plurality of micro lenses, and the holder may comprise an opening formed above the diffuser lens and a stopping protrusion for inhibiting the diffuser lens from being separated through the opening.

The upper surface of the diffuser lens may be larger than the size of the opening.

At least a portion of the opening may be defined by at least a portion of the stopping protrusion.

The diffuser ring may comprise a support portion being in contact with a lower portion of the diffuser lens, and a ring portion being protruded from an outer circumference of the support portion.

The diffuser lens may comprise a lens portion and a flange portion disposed on an outer circumference of the lens portion.

The diffuser lens may comprise a protrusion formed by being protruded from a portion of a lower surface of the flange portion.

The protrusion may have a ring shape.

A gap may be formed in at least a portion between the diffuser lens and the diffuser ring by the protrusion.

The protrusion may be formed adjacent to the inner circumferential surface than the outer circumferential surface of the flange portion.

The diffuser ring may comprise a recess formed on the support portion and coupled to the protrusion.

The diffuser lens may comprise a protruding portion for a coupling guide, the holder may comprise a groove corresponding to the protrusion, and at least a portion of the protruding portion of the diffuser lens may be disposed in the groove of the holder.

The diffuser lens may comprise a first portion being overlapped with the stopping protrusion in a vertical direction, and a second portion being overlapped with the opening in the vertical direction.

The stopping protrusion of the holder may be disposed between the diffuser lens and the opening.

The stopping protrusion of the holder may contact a portion of an upper surface of the diffuser lens.

The diffuser lens and the diffuser ring may be separated from each other.

The diffuser lens may be inserted upward in a vertical direction to be coupled to the holder.

The upward direction may be a direction from a lower portion of the holder toward an upper portion of the holder.

A portion of the diffuser lens may be overlapped with the holder in the upward direction.

The portion of the diffuser lens may be overlapped with the holder and the diffuser ring in the vertical direction.

The holder comprises a barrel portion on which the diffuser lens is disposed, and the stopping protrusion of the holder is extended from the barrel portion toward the inner side and is disposed on the diffuser lens, and the portion of the diffuser lens may be overlapped with the stopping protrusion of the holder in the upward direction.

At least a portion of the diffuser ring may be disposed on the barrel portion, and the diffuser ring may be disposed below the diffuser lens.

The holder comprises a second groove formed on a surface of the diffuser ring facing an upper surface of the ring portion, and the second groove of the holder may form a passage connected to an inner space between the holder and the substrate.

The second groove of the holder may be a passage connecting the inner space and the outer space of the holder.

The outer circumference of the diffuser lens may comprise four planes, and the barrel portion of the holder may comprise protrusions protruding from the inner circumference of the barrel portion and being in contact with each of the four planes of the diffuser lens.

Two of the four planes may be disposed in the opposite side from each other.

The light emitting module further comprises a shield can comprising an upper plate and a side plate being extended downward from the upper plate, the holder comprises a body portion disposed on an upper surface of the substrate, a barrel portion being protruded from the upper surface of the body portion, and a first groove being formed on the upper surface of the body portion, an adhesive for fixing the upper plate of the shield can to the holder is disposed in the first groove of the holder, and the first groove may comprise a first portion being extended in the first direction among the horizontal directions, and a second portion being extended in a second direction perpendicular to the first direction among the horizontal directions.

The shield can covers the body portion of the holder and may be electrically connected to the substrate.

The diffuser lens comprises a lens portion disposed on an optical path of light being emitted from the light source, and a flange portion disposed on an outer circumference of the lens portion, an adhesive accommodating portion being connected to the outer circumference of the flange portion of the diffuser lens is formed on a lower surface of the flange portion of the diffuser lens, and an adhesive fixing the diffuser lens to the holder may be disposed in the adhesive accommodating portion of the flange portion of the diffuser lens.

The diffuser lens and the diffuser ring may be integrally formed.

The diffuser lens comprises a protruding portion being protruded from an outer circumference of the diffuser lens, the diffuser ring comprises a protruding portion being protruded from an outer circumference of the diffuser ring, the holder comprises a groove corresponding to each of the protruding portion of the diffuser lens and the protruding portion of the diffuser ring, and the protruding portion of the diffuser lens and the protruding portion of the diffuser ring may be correspondingly disposed in a vertical direction.

The camera module according to the present embodiment comprises a substrate; a holder comprising a partition wall and disposed on the substrate; a light source disposed on one side of the partition wall on the substrate and emitting a laser light; a sensor disposed on the substrate on the other side of the partition wall; a lens coupled to the holder and disposed on the sensor; a diffuser lens coupled to the holder and disposed on the light source; and a diffuser ring supporting the diffuser lens, wherein the diffuser lens comprises a plurality of micro lenses, and wherein the holder may comprise an opening formed on the diffuser lens and a stopping protrusion inhibiting the diffuser lens from being separated through the opening.

The sensor may detect light in the wavelength band of the light source.

The camera module further comprises a filter disposed between the lens and the sensor and passing light in a wavelength band of light emitted by the light source, wherein the lens is fixed in the barrel, the barrel is screw-coupled to the holder, the filter is coupled to the holder, the holder comprises a third groove formed in a surface opposite to the upper surface of the filter, and the third groove of the holder may form a passage connected to the inner space between the substrates.

The holder comprises a first opening and a second opening, the diffuser lens is inserted and coupled to the first opening of the holder in a first direction, and the lens may be inserted into and coupled to the second opening of the holder in a second direction which is opposite to the first direction.

The diffuser lens is inserted from the lower portion of the holder to the upper portion of the holder and coupled to the first opening of the holder, the lens is inserted from the upper portion of the holder to the lower portion of the holder and coupled to the second opening of the holder, and the stopping protrusion of the holder may be caught on the upper end of the diffuser lens.

Advantageous Effects

The present embodiment may be suitable in making smartphones light, thin, short, and small through the low shoulder height of the camera module.

In the present embodiment, a phenomenon in which the diffuser lens is removed off in the upper direction of the camera module can be inhibited.

BEST MODE

Figure 1:
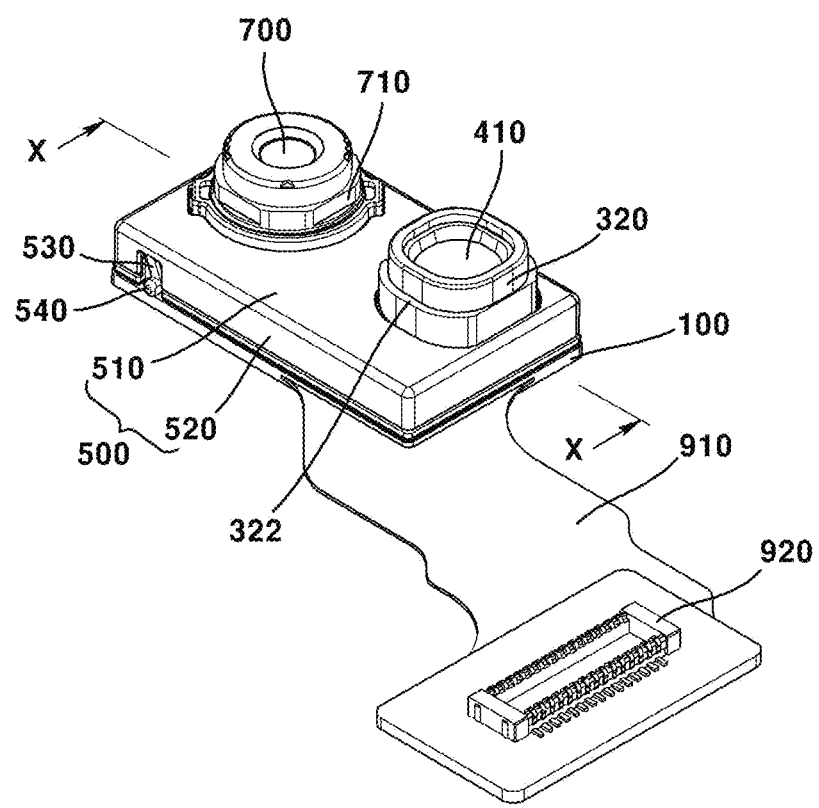
FIG. 1 is a perspective view of a camera module according to the present embodiment.

Hereinafter, preferred embodiments of the present invention will be described in detail with reference to the accompanying drawings.

However, the technical idea of the present invention is not limited to some embodiments to be described, but may be implemented in various forms, and if it is within the scope of the technical idea of the present invention, one or more of the components may be selected, combined, and substituted between the embodiments for use.

In addition, terms (comprising technical and scientific terms) used in the embodiments of the present invention are generally understood by those of ordinary skill in the technical field to which the present invention belongs unless explicitly defined and described, and it can be interpreted as a meaning, and terms generally used, such as terms defined in a dictionary, may be interpreted in consideration of the meaning in the context of the related technology.

In addition, terms used in the embodiments of the present invention are for describing the embodiments and are not intended to limit the present invention.

In the present specification, the singular form may comprise the plural form unless specifically stated in the phrase, and when described as "at least one (or more than one) of A and B and C", it may contain one or more of all combinations that can be combined with A, B, and C.

In addition, terms such as first, second, A, B, (a), (b), and the like may be used in describing the components of the embodiment of the present invention. These terms are only for distinguishing the component from other components, and are not limited to the nature, order, or order of the component by the term.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when it is described as being formed or disposed in the "top (upper side) or bottom (lower side)" of each component, the top (upper side) or bottom (lower side) not only comprises a case when the two components are in direct contact with each other but also comprises a case where one or more other components are formed or disposed between the two components. In addition, when expressed as "top (upper side) or bottom (lower side)", the meaning of not only an upward direction but also a downward direction based on one component may be comprised.

Hereinafter, a configuration of an optical apparatus according to the present embodiment will be described.

The optical apparatus may be any one of a mobile phone, a mobile phone, a smart phone, a portable smart device, a digital camera, a laptop computer, a digital broadcasting terminal, a personal digital assistant (PDA), a portable multimedia player (PMP), and a navigation device. However, the type of the optical apparatus is not limited thereto, and any device for capturing an image or a picture may be comprised in the optical apparatus.

The optical apparatus may comprise a main body. The main body may form the appearance of the optical apparatus. The main body may accommodate a camera module. A display unit may be disposed on one surface of the main body. For example, the display unit and the camera module may be disposed on one surface of the main body.

The optical apparatus may comprise a display unit. The display unit may be disposed on one surface of the main body. The display unit may output a result detected by the camera module. The display unit may be a touch screen.

The optical apparatus may comprise a camera module. The camera module may be a time of flight (TOF) module or a TOF device. The camera module may be a TOF camera module or a TOF camera device. The camera module may be an optical device. The camera module can provide TOF 3D detection technology. The camera module may be used for facial recognition and/or iris recognition. That is, the camera module may provide a facial recognition function and/or an iris recognition function to the optical apparatus. The camera module may provide a biometric authentication function for security. The camera module may be installed in a main body of an optical apparatus. A portion of a holder 300 of the camera module and a shield can 500 are accommodated in the main body of an optical apparatus, and a portion and the like of a diffuser lens 410 of the camera module and a portion of a lens 700 may be protruded from the main body of the optical apparatus.

In the present embodiment, it may comprise a structure coupled in a manner that a diffuser lens 410 disposed protrudedly from the main body of the optical apparatus is inserted from the lower direction (inner side) of the holder 300 so that it is not removed off toward the outer side. In the present embodiment, a phenomenon in which the diffuser lens 410 inserted into the holder 300 from the lower side (inner side) is caught by a stopping protrusion (protruding portion) 330 at the upper end of a holder 300, thereby being removed off toward the outer side can be inhibited.

Hereinafter, the configuration of the camera module will be described with reference to the drawings.

Figure 2:
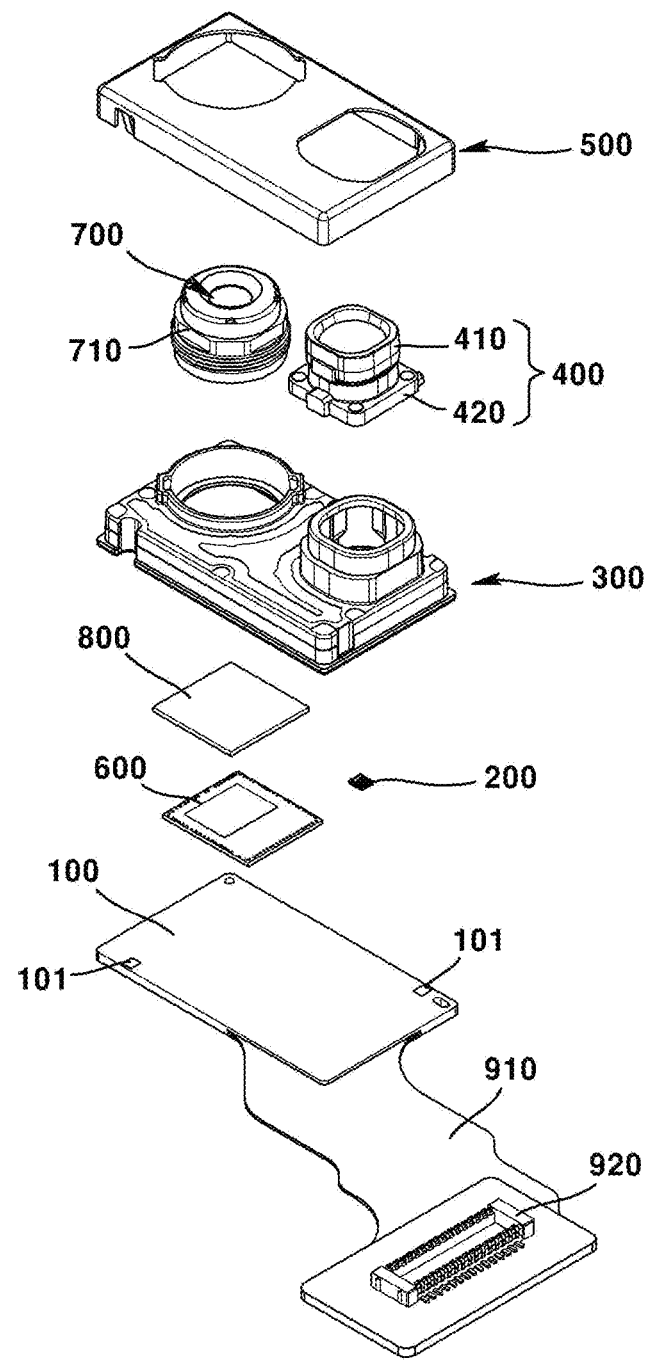
FIG. 2 is an exploded perspective view of the camera module according to the present embodiment.
Figure 3:
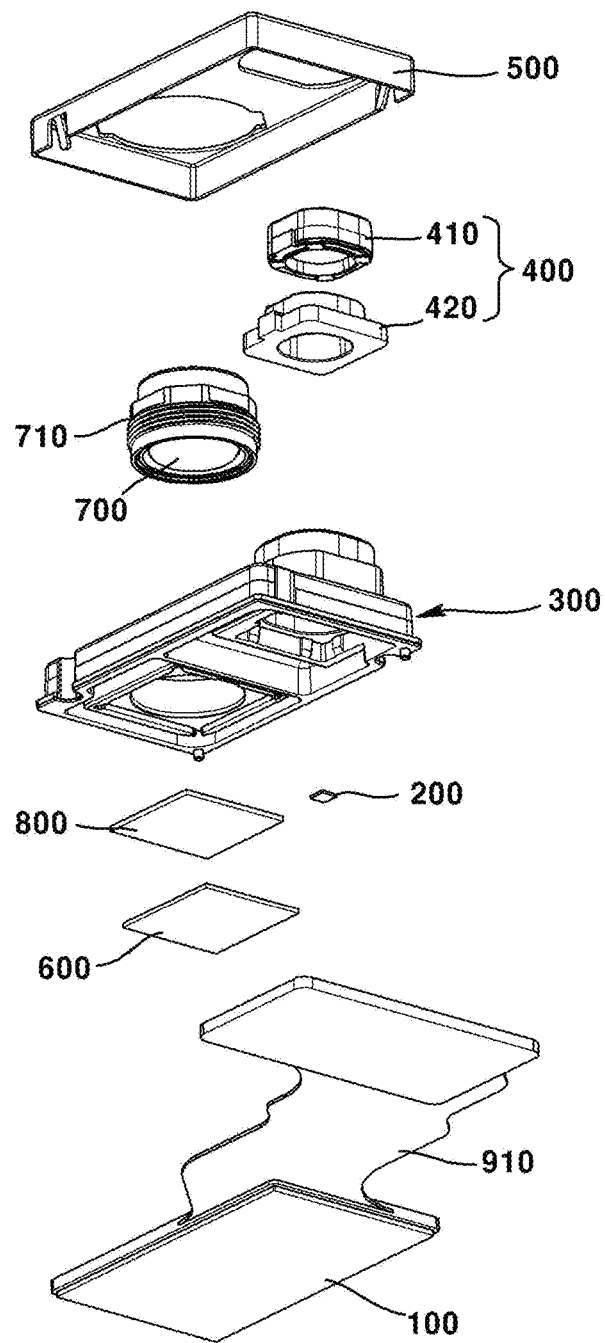
FIG. 3 is a bottom exploded perspective view of the camera module according to the present embodiment.
Figure 4:
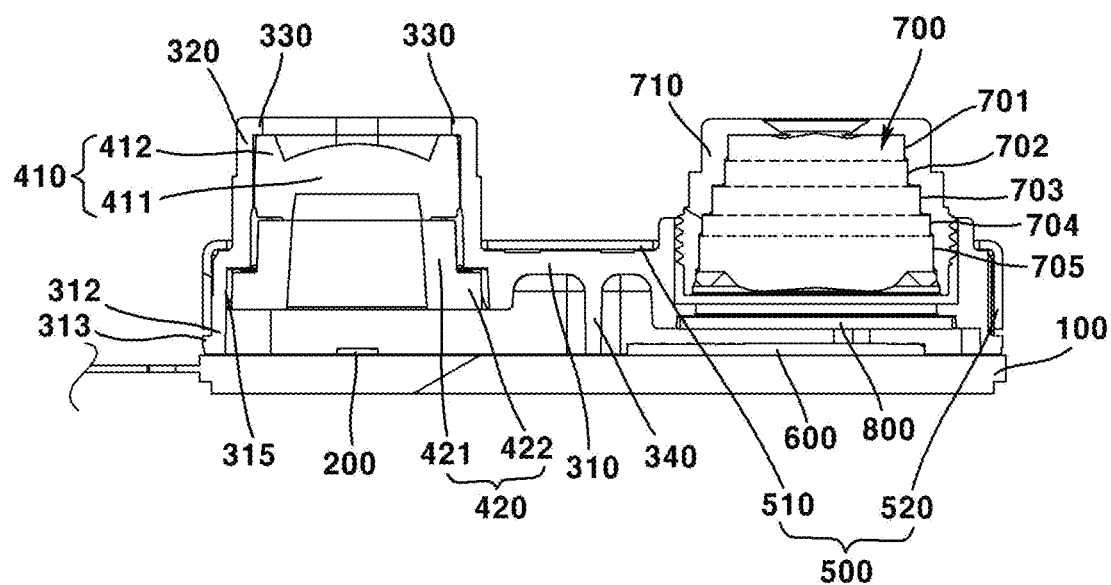
FIG. 4 is a cross-sectional view taken along line X-X of FIG. 1.
Figure 5:
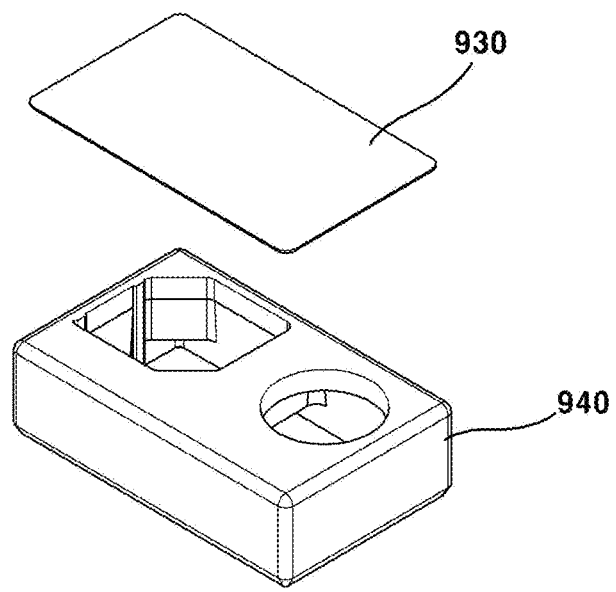
FIG. 5 is a perspective view of a cab and a tape for packaging a camera module according to the present embodiment.
Figure 6:
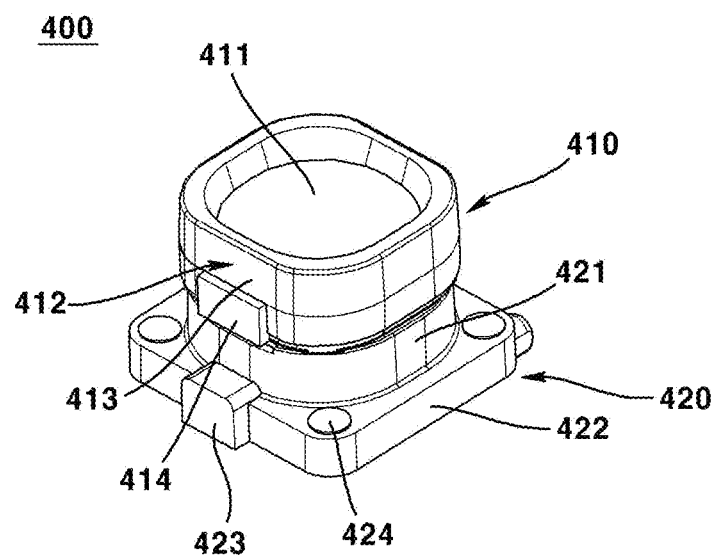
FIG. 6 is a perspective view of a diffuser lens module of a camera module according to the present embodiment.
Figure 7:
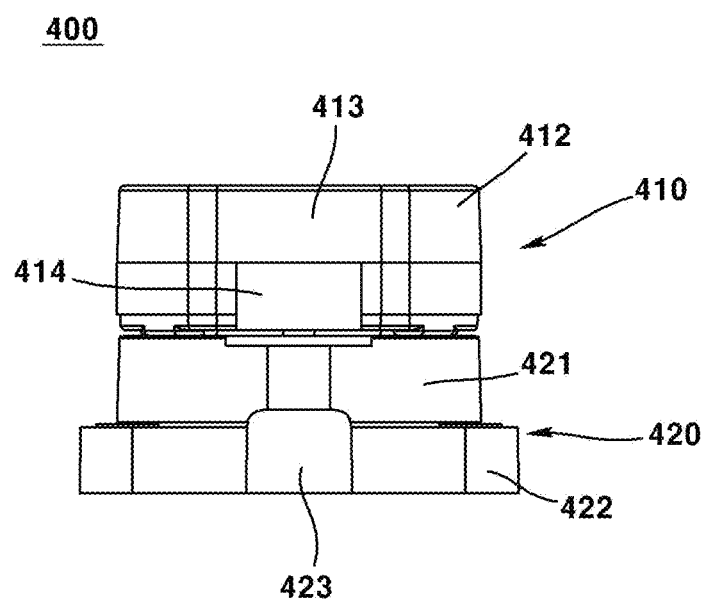
FIG. 7 is a side view of a diffuser lens module of a camera module according to the present embodiment.
Figure 8:
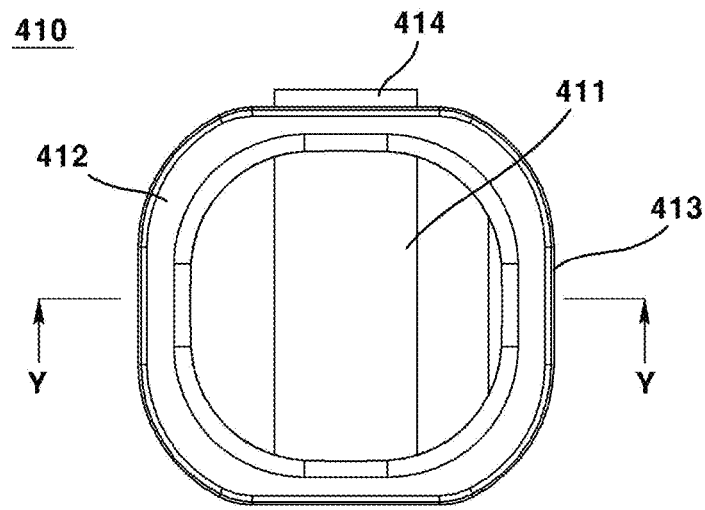
FIG. 8 is a plan view of a diffuser lens of a camera module according to the present embodiment.
Figure 9:
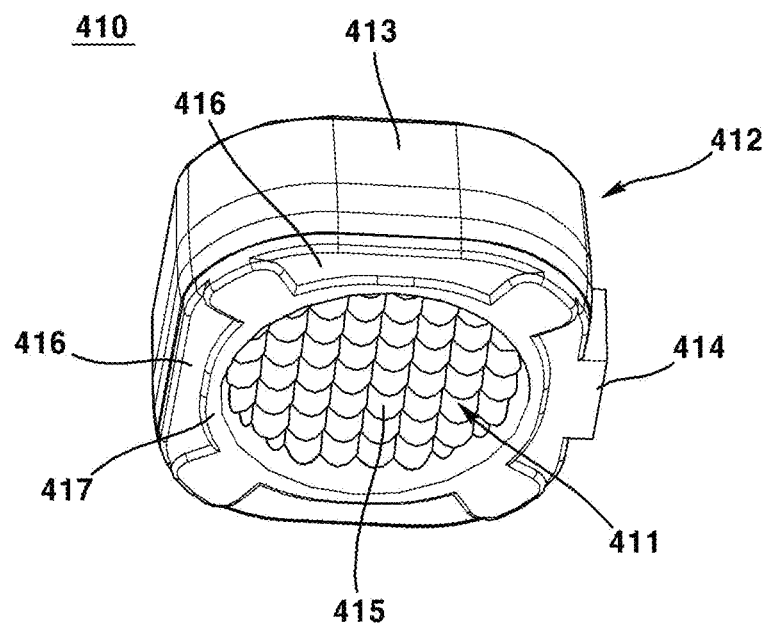
FIG. 9 is a bottom perspective view of a diffuser lens of a camera module according to the present embodiment.
Figure 10:
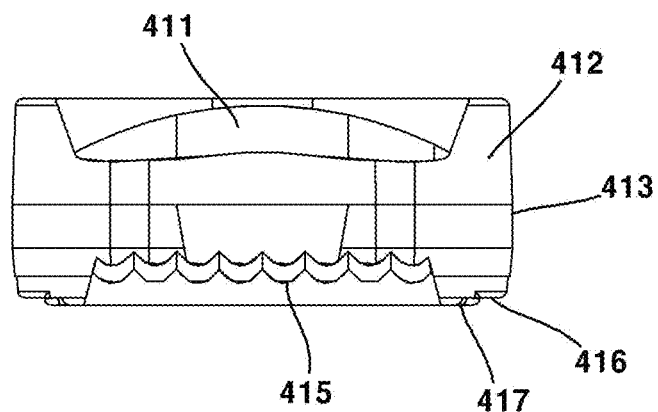
FIG. 10 is a cross-sectional view taken along line Y-Y of FIG. 8.
Figure 11:
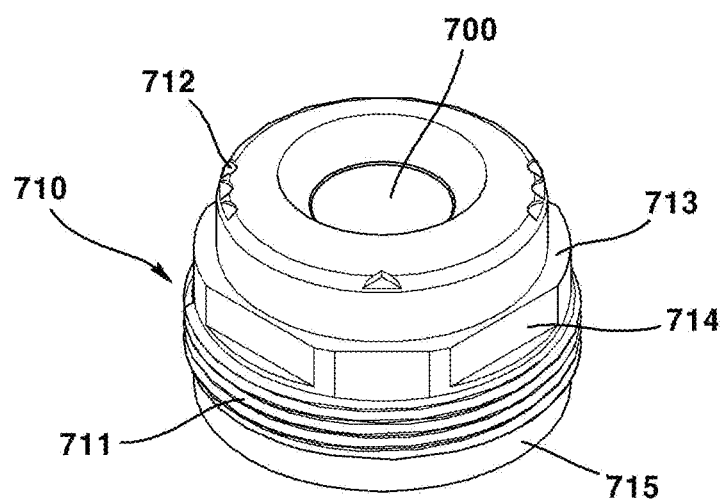
FIG. 11 is a perspective view of a lens and a barrel of a camera module according to the present embodiment.
Figure 12:
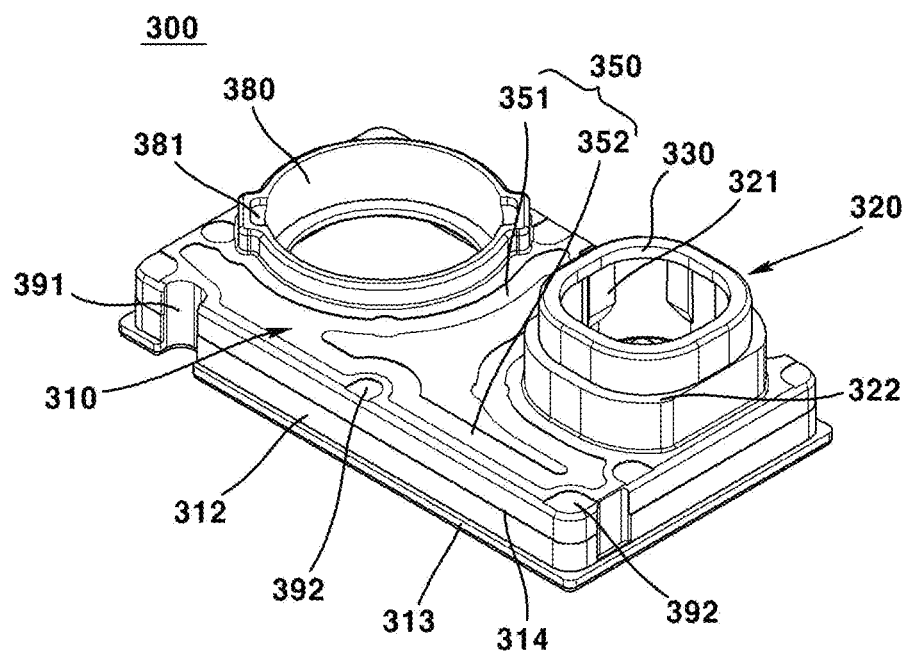
FIG. 12 is a perspective view of a holder of a camera module according to the present embodiment.
Figure 13:
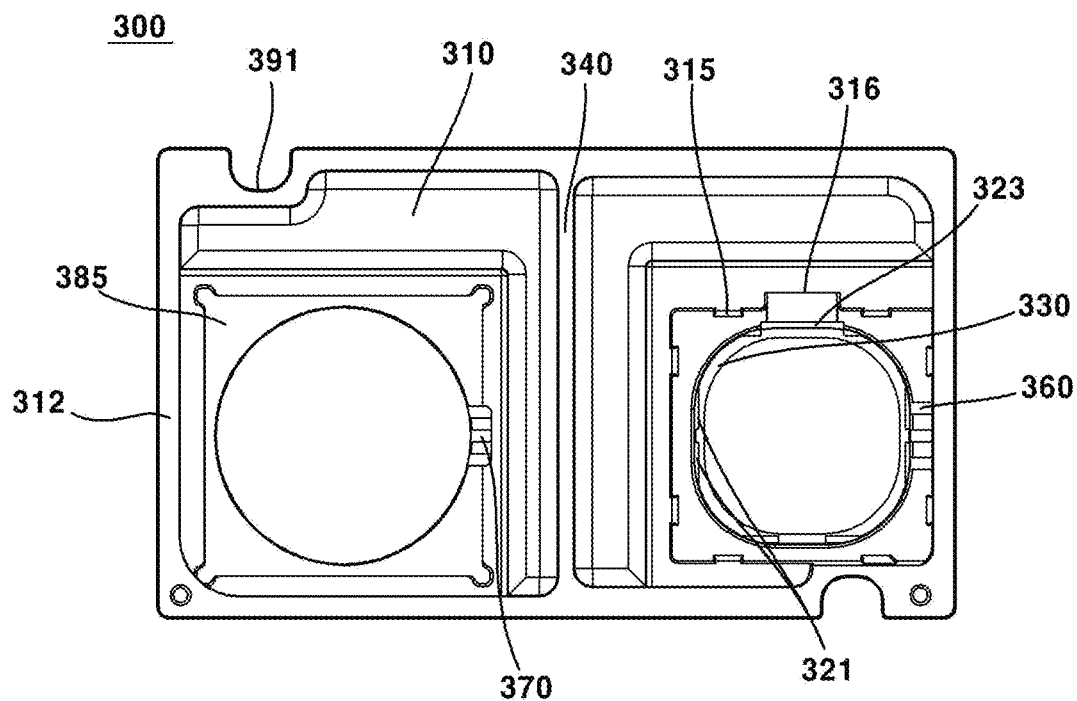
FIG. 13 is a bottom view of a holder of a camera module according to the present embodiment.
Figure 14:
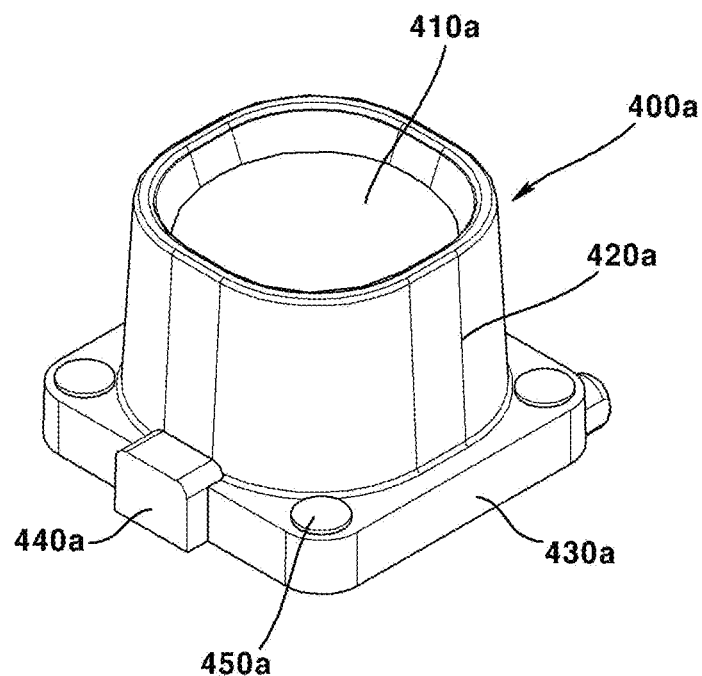
FIG. 14 is a perspective view of a diffuser lens of a camera module according to a modified embodiment.
Figure 15:
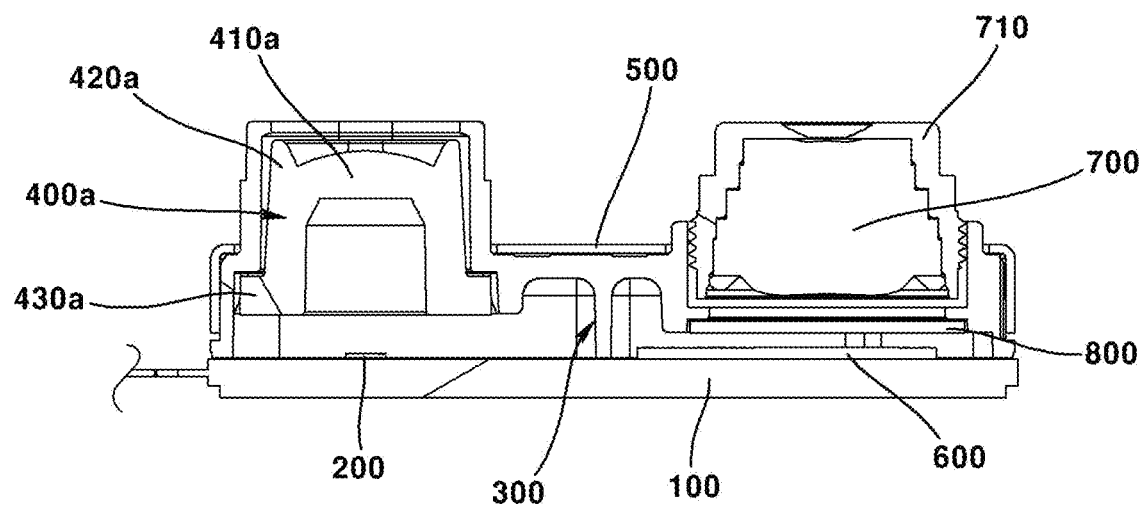
FIG. 15 is a cross-sectional view of a camera module to which a diffuser lens according to a modified embodiment is applied.

FIG. 1 is a perspective view of a camera module according to the present embodiment, FIG. 2 is an exploded perspective view of the camera module according to the present embodiment, FIG. 3 is a bottom exploded perspective view of the camera module according to the present embodiment, FIG. 4 is a cross-sectional view taken along line X-X of FIG. 1, FIG. 5 is a perspective view of a cab and a tape for packaging a camera module according to the present embodiment, FIG. 6 is a perspective view of a diffuser lens module of a camera module according to the present embodiment, FIG. 7 is a side view of a diffuser lens module of a camera module according to the present embodiment, FIG. 8 is a plan view of a diffuser lens of a camera module according to the present embodiment, FIG. 9 is a bottom perspective view of a diffuser lens of a camera module according to the present embodiment, FIG. 10 is a cross-sectional view taken along line Y-Y of FIG. 8, FIG. 11 is a perspective view of a lens and a barrel of a camera module according to the present embodiment, FIG. 12 is a perspective view of a holder of a camera module according to the present embodiment, FIG. 13 is a bottom view of a holder of a camera module according to the present embodiment, FIG. 14 is a perspective view of a diffuser lens of a camera module according to a modified embodiment, and FIG. 15 is a cross-sectional view of a camera module to which a diffuser lens according to a modified embodiment is applied.

The camera module may comprise a light emitting module and a light receiving module. However, since the substrate 100, the holder 300, and the shield can 500 are integrally formed and used in common with the light emitting module and the light receiving module, it may be difficult to distinguish the light emitting module and the light receiving module. In this case, each of the above components may be understood as a component of each of the light emitting module and the light receiving module. However, as a modified embodiment, the common components of the substrate 100, the holder 300, and the shield can 500, and the like may be separately provided to the light emitting module and the light receiving module.

The camera module may comprise a light emitting module. The light emitting module can emit light. The light emitted from the light emitting module may hit a subject disposed in front direction (upper direction) of the light emitting module and be reflected. The light emitting module may comprise a substrate 100, a light source 200, a holder 300, a diffuser lens 410, a diffuser ring 420, and a shield can 500.

The camera module may comprise a light receiving module. The light receiving module can detect light. The light receiving module may detect light emitted from the light emitting module and reflected by hitting the subject. Through this, the light receiving module may recognize depth information (3D information) and/or pattern information of the subject. The light receiving module may comprise a substrate 100, a sensor 600, a filter 800, a holder 300, a lens 700, a barrel 710, and a shield can 500.

The camera module may comprise a substrate 100. The substrate 100 may comprise a printed circuit board (PCB). The substrate 100 may be connected to the connector 920 through a FPCB 910. The substrate 100 and the FPCB 910 may be formed of a rigid flexible PCB (RFPCB). A light source 200 and a sensor 600 may be disposed in the substrate 100. The substrate 100 may be disposed below the holder 300. The substrate 100 may comprise a terminal 110. The terminal 110 of the substrate 100 may be coupled to a coupling portion 530 of the shield can 500. The terminal 110 of the substrate 100 may comprise a plurality of terminals. The terminal 110 of the substrate 100 may comprise two terminals.

The camera module may comprise a light source 200. The light source 200 may be disposed on the substrate 100. The light source 200 may be disposed in contact with the substrate 100. The light source 200 may be disposed above the substrate 100. The light source 200 may emit a laser light. The light source 200 may be disposed in the substrate 100. The light source 200 may be disposed on one side of a partition wall 340 of the holder 300 on the substrate 100. The light source 200 may emit light. The light source 200 may emit infrared rays. The light source 200 may comprise an infrared laser. The light source 200 may comprise a semiconductor laser diode. The light source 200 may comprise a vertical cavity surface emitting laser (VCSEL). Light emitted from the light source 200 may be emitted to form a substantially rectangular cross section while passing through the diffuser lens 410. The shape of the cross section of the light emitted from the light source 200 and passed through the diffuser lens 410 may correspond to the shape of the effective area of the sensor 600. However, the size of the cross-section of the light emitted from the light source 200 and passed through the diffuser lens 410 may be larger than the size of the effective area of the sensor 600 by a predetermined size.

The camera module may comprise a holder 300. The holder 300 may be disposed on the substrate 100. The holder 300 may be disposed in contact with the substrate 100. The holder 300 may be disposed above the substrate 100. The holder 300 may be disposed above the substrate 100. The holder 300 may be disposed in the substrate 100. The holder 300 may be fixed to the substrate 100 by an adhesive. The holder 300 may accommodate a light source 200, a diffuser lens module 400, a sensor 600, and a filter 800 therein. The holder 300 may be a plastic injection product. The holder 300 may be formed by injection.

The holder 300 may comprise a first opening and a second opening. The holder 300 may comprise a first opening in which the diffuser lens 410 is disposed and a second opening in which the lens 700 is disposed. The diffuser lens 410 is inserted in the first direction into the first opening of the holder 300 and coupled thereto, and the lens 700 may be inserted into the second opening of the holder 300 in a second direction which is an opposite direction to the first direction and coupled thereto. The diffuser lens 410 is inserted from the lower portion of the holder 300 toward the upper portion of the holder 300 and coupled to the first opening of the holder 300, and the lens 700 may be inserted from the upper portion of the holder 300 toward the lower portion of the holder 300 and coupled to the second opening of the holder 300. The holder 300 may comprise a stopping protrusion 330 supporting the upper end of the diffuser lens 410 and a bottom surface supporting the lower end of the lens 700. The stopping protrusion 330 of the holder 300 may be caught on the upper end of the diffuser lens 410. A filter 800 may be disposed on the opposite side of the bottom surface of the holder 300. The holder 300 may comprise a stopping protrusion disposed between the lens 700 and the filter 800.

The holder 300 may comprise a body portion 310. The body portion 310 may be disposed on an upper surface of the substrate 100. The body portion 310 may be coupled to the diffuser lens module 400. The body portion 310 may be coupled to the barrel 710 of the lens 700. The portion 310 may be coupled to the filter 800.

The body portion 310 may comprise a sidewall 312. The sidewall 312 may be disposed on the substrate 100. The sidewall 312 may comprise a plurality of sidewalls. The sidewall 312 may comprise four sidewalls. The sidewall 312 may comprise a first sidewall, a second sidewall disposed opposite the first sidewall, and a third sidewall and a fourth sidewall disposed opposite to each other between the first sidewall and the second sidewall.

The body portion 310 may comprise a step portion 313. The step portion 313 may be formed by being protruded outward at the lower end portion of the sidewall 312. The step portion 313 may be overlapped with the side plate 520 of the shield can 500 in a vertical direction. The step portion 313 may provide an effect of increasing the area of the lower surface of the holder 300. Through this, the contact area (area adhered by the adhesive) between the holder 300 and the substrate 100 is widened, so that a phenomenon in which the holder 300 is removed off from the substrate 100 may be reduced. In the present embodiment, the step portion 313 and the side plate 520 of the shield can 500 are spaced apart, but in a modified embodiment, the side plate 520 of the shield can 500 may be seated on the step portion 313.

The body portion 310 may comprise a step 314. The step 314 may be formed on the outer surface of the sidewall 312. The step 314 may comprise a bottom surface that is disposed to look upward. At this time, the adhesive fixing the holder 300 and the shield can 500 may be placed down from the upper surface of the body portion 310 of the holder 300 along the outer surface of the sidewall 312 to the bottom surface of the step 314.

The body portion 310 may comprise a protrusion 315. The protrusion 315 may be formed on the inner circumferential surface of the holder 300. The protrusion 315 may be formed on a surface corresponding to the diffuser ring 420 of the inner circumferential surface of the holder 300 to support the diffuser ring 420. The protrusion 315 may be in surface contact with the outer surface of the diffuser ring 420. Through this, the protrusion 315 may inhibit a phenomenon in which the diffuser ring 420 is being rotated. That is, the protrusion 315 can fix the diffuser ring 420 in the correct position.

The body portion 310 may comprise a groove 316. The groove 316 may be formed at a position corresponding to the protruding portion 423 formed in the diffuser ring 420. The groove 316 may accommodate at least a portion of the protruding portion 423 of the diffuser ring 420.

The holder 300 may comprise a barrel portion 320. At least a portion of the diffuser lens 410 and the diffuser ring 420 may be disposed in the barrel portion 320. The barrel portion 320 may accommodate the diffuser lens 410. The barrel portion 320 may be protruded from the upper surface of the body portion 310.

In the present embodiment, the body portion 310 of the holder 300 forming the shoulder of the optical device and the upper plate 510 of the shield can 500 may be disposed at a position lower than the upper end of the barrel portion 320. Through this structure, even when the optical device is mounted on an optical apparatus such as a smart phone, the barrel portion 320 may be protruded from the main body of the optical apparatus.

The barrel portion 320 may comprise a protrusion 321. The protrusion 321 may be protruded from the inner circumference of the barrel portion 320. The protrusion 321 may be in contact with each of the four planes 413 of the diffuser lens 410. The protrusion 321 may be formed on four surfaces corresponding to the four planes 413 of the diffuser lens 410 among the inner circumferential surfaces of the barrel portion 320, respectively. For example, the protrusions 321 may be formed in a total of eight, two on each of four surfaces of the inner circumferential surface of the barrel portion 320. In a modified embodiment, the protrusion 321 may be formed in a total of four, one on each of the four surfaces of the inner circumferential surface of the barrel portion 320. The outer surface of the protrusion 321 may be in surface contact with the plane 413 of the diffuser lens 410. Accordingly, the outer surface of the protrusion 321 may also comprise a plane. Through such a structure, the protrusion 321 of the barrel portion 320 may prevent inhibit a phenomenon in which the diffuser lens 410 is being rotated. That is, the protrusion 321 of the barrel portion 320 may fix the diffuser lens 410 in the correct position.

The barrel portion 320 may comprise a step 322. The step 322 may be formed on the outer side surface of the barrel portion 320. Since the width of the upper portion of the barrel portion 320 becomes narrower through the step 322, the size of a portion being protruded to the outside of the main body of an optical apparatus such as a smart phone may be reduced.

The barrel portion 320 may comprise a groove 323. The groove 323 may be formed at a position corresponding to the protruding portion 414 of the diffuser lens 410. The groove 323 may accommodate at least a portion of the protruding portion 414 of the diffuser lens 410.

The holder 300 may comprise a stopping protrusion 330. The holder 300 may comprise an opening formed on the diffuser lens 410 and a stopping protrusion 330 that inhibits the diffuser lens 410 from being separated through the opening. At this time, at least a portion of the opening may be defined by at least a portion of the stopping protrusion 330. The opening may be an opening defined by at least a portion of the stopping protrusion 330. The stopping protrusion 330 may form a portion of the opening. The stopping protrusion 330 may be formed so that the diffuser lens 410 is not removed off. The stopping protrusion 330 may be extended inwardly from the barrel portion 320. The stopping protrusion 330 may be disposed above the diffuser lens 410. The stopping protrusion 330 may provide a hole so that a light passing through the diffuser lens 410 can pass through.

The stopping protrusion 330 may be disposed between the diffuser lens 410 and the opening. The stopping protrusion 330 may be in contact with a portion of an upper surface of the diffuser lens 410.

In the present embodiment, the holder 300 may comprise a hole formed by the inner circumference of the stopping protrusion 330. The size of the hole of the holder 300 in the horizontal direction may be smaller than the size of the upper end of the diffuser lens 410 in a corresponding direction. Through this, the stopping protrusion 330 of the holder 300 may provide a stopping protrusion for the diffuser lens 410. Therefore, simply by inserting the diffuser lens 410 from the lower side of the holder 300, the diffuser lens 410 may be in contact with the stopping protrusion 330 to be placed in a correct position. An adhesive may be applied between the diffuser lens 410 and the inner circumferential surface of the barrel portion 320.

The holder 300 may comprise a partition wall 340. The partition wall 340 may partition a space between the holder 300 and the substrate 100. The partition wall 340 may divide the space between the holder 300 and the substrate 100 into a first space in which the light source 200 is disposed and a second space in which the sensor 600 is disposed. Through this, it is possible to block the light emitted from the light source 200 from directly entering the sensor 600 without passing through the diffuser lens 410. The partition wall 340 may connect two sidewalls 312 disposed opposite to each other.

The holder 300 may comprise a first groove 350. The first groove 350 may be formed on an upper surface of the body portion 310. An adhesive that fixes the upper plate 510 of the shield can 500 to the holder 300 may be disposed in the first groove 350 of the holder 300. The first groove 350 of the holder 300 may be an adhesive receiving groove in which the adhesive is disposed. The first groove 350 may improve the fixing power of the adhesive. That is, even if an external force acts on the shield can 500 as the adhesive is disposed in the first groove 350, a phenomenon in which the shield can 500 is removed off may be minimized.

In the present embodiment, the first groove 350 of the holder 300 may comprise a first portion 351 and a second portion 352. In more detail, the first groove 350 of the holder 300 may comprise a first portion 351 whose length in the first direction is longer than the length in the second direction perpendicular to the first direction among the horizontal directions, and a second portion 352 whose length in the second direction is longer than a length in the first direction. At this time, the first direction may be an x-axis direction, and the second direction may be a y-axis direction. That is, the first groove 350 of the holder 300 may comprise a portion in which an adhesive providing a fixing force to the shield can 500 is accommodated when the shield can 500 is pressed in the x-axis direction, and a portion in which an adhesive providing a fixing force to the shield can 500 is accommodated when the shield can 500 is pressed in the y-axis direction. Accordingly, even if an external force acts on the shield can 500 in any of the horizontal directions, a phenomenon in which the shield can 500 is removed off from the holder 300 can be minimized. The first groove 350 may be depressed to a deeper depth than the fifth groove 392.

The holder 300 may comprise a second groove 360. The second groove 360 may be formed on a surface of the diffuser ring 420 opposite to the upper surface of the ring portion 422. The second groove 360 may comprise a plurality of grooves. The second groove 360 of the holder 300 may form a passage between the upper surface of the ring portion 422 of the diffuser ring 420 and the holder 300. The second groove 360 of the holder 300 may form a passage connecting the inner space between the holder 300 and the substrate 100 and the outer space of the holder 300. Through this, the second groove 360 of the holder 300 may provide a vent hole, which is a passage through which gas generated in the inner space between the substrate 100 and the holder 300 is discharged, in the process of curing the adhesive bonding the substrate 100 and the holder 300.

The holder 300 may comprise a third groove 370. The third groove 370 may be formed on a surface facing the upper surface of the filter 800. The third groove 370 may comprise a plurality of grooves. The third groove 370 of the holder 300 may form a passage between the upper surface of the filter 800 and the holder 300. The third groove 370 of the holder 300 may form a passage connecting the inner space between the holder 300 and the substrate 100 and the outer space of the holder 300. Through this, the third groove 370 of the holder 300 may provide a vent hole, which is a passage through which gas generated in an inner space between the substrate 100 and the holder 300 is discharged, in the process of curing the adhesive bonding the substrate 100 and the holder 300. In the present embodiment, the space between the holder 300 and the substrate 100 is divided into a first space and a second space by the partition wall 340, the gas in the first space may be discharged through the second groove 360 of the holder 300, and gas in the second space may be discharged through the third groove 370 of the holder 300.

The holder 300 may comprise a lens coupling portion 380. The lens 700 and the barrel 710 may be coupled to the lens coupling unit 380. The lens coupling portion 380 may comprise a groove into which the barrel 710 is inserted. The lens coupling portion 380 may comprise the barrel 710 or a bottom surface with which the lower end of the lens 700 is in contact. Although not shown in the drawing, a thread corresponding to a thread 711 of the barrel 710 may be formed on an inner circumferential surface of the lens coupling portion 380. However, the thread may not be formed. The lens coupling portion 380 may comprise a protruding portion protruding from an upper surface of the body portion 310. The lens coupling portion 380 may comprise a groove 381 formed on an upper surface of the protruding portion. An adhesive for bonding the barrel 710 and the holder 300 may be applied to the groove 381 of the lens coupling portion 380. The groove 381 may be disposed in a diagonal direction other than the x-axis and y-axis directions in the horizontal direction.

In the present embodiment, the upper surface of the body portion 310 may be disposed between the upper end of the thread of the lens coupling portion 380 and the lower end of the thread of the lens coupling portion 380. In addition, an upper surface of the body portion 310 or an upper plate 510 of the shield can 500 may be disposed between the upper end of the thread 711 of the barrel 710 and the lower end of the thread 711 of the barrel 710.

The holder 300 may comprise a filter coupling portion 385. The filter 800 may be coupled to the filter coupling portion 385. The filter coupling portion 385 may comprise a groove having a size corresponding to the filter 800. The filter 800 may be inserted into the groove of the filter coupling portion 385 and fixed with an adhesive. The filter coupling portion 385 may comprise a ceiling surface with which the upper surface of the filter 800 is in contact. A third groove 370 may be formed in a ceiling surface of the filter coupling portion 385.

The holder 300 may comprise a fourth groove 391. The fourth groove 391 may be formed in the sidewall 312 of the holder 300. The fourth groove 391 may be a groove that avoids the coupling portion 530 of the shield can 500. The fourth groove 391 may be formed on two side surfaces of the holder 300 that are opposite to each other. In the fourth groove 391, a coupling portion 530 of the shield can 500 and a solder ball 540 connecting the coupling portion 530 and the substrate 100 may be disposed. The fourth groove 391 may comprise a flat surface and a curved surface.

The holder 300 may comprise a fifth groove 392. The fifth groove 392 may be formed on an upper surface of the body portion 310 of the holder 300. The fifth groove 392 may comprise a plurality of grooves. The fifth groove 392 may comprise six grooves. The fifth groove 392 may be a push pin groove generated by a push pin during a process of injection molding the holder 300 and separating it from the mold.

The camera module may comprise a diffuser lens module 400. The diffuser lens module 400 may comprise a diffuser lens 410 and a diffuser ring 420. The diffuser lens module 400 may be integrally formed as in the modified embodiment, but in the present embodiment, the diffuser lens 410 and the diffuser ring 420 may be separately manufactured to increase moldability during injection molding. The diffuser lens 410 and the diffuser ring 420 may be separated from each other.

The camera module may comprise a diffuser lens 410. The diffuser lens 410 may be disposed in the holder 300. The diffuser lens 410 may be coupled to the holder 300. The diffuser lens 410 may be fixed to the holder 300. The diffuser lens 410 may be disposed on an optical path of light emitted from the light source 200. The diffuser lens 410 may be disposed on the light source 200. The diffuser lens 410 may be disposed on the light source 2000. The diffuser lens 410 may be a plastic injection product. The diffuser lens 410 may be formed by plastic injection. The height of the upper end of the diffuser lens 410 may correspond to the height of the upper end of the lens 700. The diffuser lens 410 may be disposed at a height corresponding to the first to third lenses 701, 702, and 703 disposed above the lens 700. The diffuser lens 410 may be inserted in the upward direction among the vertical directions to be coupled to the holder 300. In this case, the upward direction may be a direction from the lower portion of the holder 300 toward the upper portion of the holder 300. A portion of the diffuser lens 410 may be overlapped with the holder 300 in an upward direction.

In the present embodiment, a portion of the diffuser lens 410 may be disposed between the holder 300 and the diffuser ring 420 in a vertical direction. At this time, the vertical direction may be the z-axis direction. In more detail, a portion of the diffuser lens 410 may be disposed between the stopping protrusion 330 of the holder 300 and the diffuser ring 420 in a vertical direction. In this case, a portion of the diffuser lens 410 may be overlapped with the holder 300 and the diffuser ring 420 in a vertical direction. Meanwhile, the diffuser lens 410 may be coupled by being inserted from the lower side of the holder 300. In this case, the diffuser lens 410 is caught by the holder 300, thereby inhibiting from being upwardly removed off, and since it is supported by the diffuser ring 420, a phenomenon of being downwardly removed off can also be inhibited. That is, the upper end of the diffuser lens 410 may be in contact with the holder 300 and the lower end of the diffuser lens 410 may be fixed by being contacted with the diffuser ring 420. Further, a separate adhesive may fix the diffuser lens 410 to the holder 300. The size of the diffuser lens 410 may be larger than the opening of the stopping protrusion 330 of the holder 300. The upper surface of the diffuser lens 410 may be larger than the size of the opening of the stopping protrusion 330 of the holder 300. The diffuser lens 410 may comprise a first portion being overlapped with the stopping protrusion 330 in a vertical direction and a second portion being overlapped with the opening in a vertical direction.

The diffuser lens 410 may comprise a lens unit 411. The lens unit 411 may be disposed on an optical path of a light emitted from the light source 200. The light passing through the lens unit 411 may have a rectangular cross section.

The diffuser lens 410 may comprise a flange portion 412. The flange portion 412 may be disposed on the outer circumference of the lens portion 411. The flange portion 412 may be integrally formed with the lens portion 411. The flange portion 412 may be fixed to the barrel portion 320 of the holder 300. The flange portion 412 may be fixed to the diffuser ring 420. The flange portion 412 may be supported by the diffuser ring 420. The flange portion 412 may be fixed to the inner circumferential surface of the barrel portion 320 of the holder 300 by an adhesive.

The diffuser lens 410 may comprise a plane 413. The plane 413 may be referred to as a guide portion. The diffuser lens 410 may comprise a plurality of planes 413. The diffuser lens 410 may comprise four planes 413. At this time, the four planes 413 may be disposed on opposite sides of each other. In addition, the four planes 413 may be disposed symmetrically. The four planes 413 may comprise a first plane, a second plane disposed opposite the first plane, and a third plane and a fourth plane disposed on opposite sides between the first plane and the second plane. The areas of the first and second planes may be smaller than the areas of the third and fourth planes. That is, the length of the first and second planes in the horizontal direction may be smaller than the length of the third and fourth planes in the horizontal direction. However, a cross-section of a shape formed by meeting virtual planes extending each of the first and second planes and virtual planes extending each of the third and fourth planes may be square. That is, the length of the curved surface may be long on the side where the first and second planes are disposed. In the present embodiment, erroneous insertion can be inhibited in the process of inserting the diffuser lens 410 into the holder 300 through a feature having different lengths and/or areas between planes. The protruding portion 414 may be disposed in portions corresponding to the third and fourth planes.

The diffuser lens 410 may comprise a protruding portion 414. The protruding portion 414 may be a gate protruding portion. However, the protruding portion 414 may be a protrusion irrelevant to the gate. The protruding portion 414 may be generated in a process of injection molding the diffuser lens 410. The protruding portion 414 may be disposed in the groove 323 of the barrel portion 320. The protruding portion 414 may comprise a protrusion. The lower surface of the protruding portion 414 may be disposed on the same surface as the lower surface of the diffuser lens 410.

The diffuser lens 410 may comprise a micro lens array 415. The diffuser lens 410 may comprise a plurality of micro lenses. The micro lens array 415 may comprise a plurality of micro lenses. The plurality of micro lenses may be disposed on the lower surface of the lens portion 411 of the diffuser lens 410 at equal intervals. The plurality of micro lenses may have the same shape. However, the micro lenses at a portion adjacent to the flange portion 412 may have some different shapes. The curvature of each of the micro lenses may be in a micro numerical range.

In the present embodiment, the effective sensing area of the sensor 600 may be rectangular and the lens portion 411 of the diffuser lens 410 may be approximately square. Accordingly, each of the plurality of micro lenses may have different curvatures in the x-axis direction and the y-axis direction. Through such a structure, a light passing through the diffuser lens 410 may have a rectangular cross section.

The diffuser lens 410 may comprise an adhesive accommodating portion 416. The adhesive accommodating portion 416 may be formed on the lower surface of the flange portion 412 of the diffuser lens 410. The adhesive accommodating portion 416 may be connected to the outer circumference of the flange portion 412 of the diffuser lens 410. The adhesive accommodating portion 416 may be recessed from the outer circumference of the flange portion 412 of the diffuser lens 410. In the present embodiment, an adhesive fixing the diffuser lens 410 to the holder 300 may be disposed in the adhesive accommodating portion 416 of the flange portion 412 of the diffuser lens 410. Some of the adhesive applied to the adhesive accommodating portion 416 may flow between the outer circumferential surface of the flange portion 412 of the diffuser lens 410 and the inner circumferential surface of the barrel portion 320. The adhesive accommodating portion 416 may comprise a plurality of grooves. The adhesive accommodating portion 416 may comprise four grooves. However, the adhesive accommodating portion 416 has a recessed configuration compared to the protrusion 417, and the protrusion 417 is protruded from the lower surface of the flange portion 412 of the diffuser lens 410, and the adhesive accommodating portion 416 may be formed by the lower surface of the flange portion 412 of the diffuser lens 410.

The diffuser lens 410 may comprise a protrusion 417. The protrusion 417 may be formed by being protruded from a portion of the lower surface of the flange portion 412. The protrusion 417 may have a ring shape. The protrusion 417 may be a rectangular ring, a circular ring, or a polygonal ring. The protrusion 417 may be formed on an inner circumferential surface on a lower surface of the diffuser lens 410. The protrusion 417 may be understood as being protruded from a lower surface of the diffuser lens 410, or may be understood as the remaining portion in which the adhesive accommodating portion 416 is formed on a lower surface of the diffuser lens 410. The protrusion 417 may block a phenomenon in which the adhesive disposed on the adhesive accommodating portion 416 flows into the lens portion 411. However, a small amount of the adhesive may be disposed on the protrusion 417 as well. In the present embodiment, a gap may be formed in at least a portion between the diffuser lens 410 and the diffuser ring 420 by the protrusion 417. The protrusion 417 may be formed closer to the inner circumferential surface than the outer circumferential surface of the flange portion 412.

The camera module may comprise a diffuser ring 420. The diffuser ring 420 may be disposed in the holder 300. The diffuser ring 420 may be fixed to the holder 300. The diffuser ring 420 may be coupled to the holder 300. The diffuser ring 420 may be disposed accommodating portion the diffuser lens 410. The diffuser ring 420 may support the diffuser lens 410. The diffuser ring 420 may be in contact with the diffuser lens 410. The diffuser ring 420 may be a plastic injection product. The diffuser ring 420 may be formed by plastic injection.

The diffuser ring 420 may comprise a support portion 421. The support portion 421 may be in contact with the lower portion of the diffuser lens 410. The support portion 421 may support the flange portion 412 of the diffuser lens 410. The upper surface of the support portion 421 may be in contact with the lower surface of the flange portion 412 of the diffuser lens 410. At least a portion of the support portion 421 may be disposed in the barrel portion 320 of the holder 300. A portion of the support portion 421 may be understood as being disposed within the body portion 310 of the holder 300. The size of the support portion 421 in the horizontal direction may be smaller than the size of the ring portion 422 in the horizontal direction.

In a modified embodiment, the diffuser ring 420 may comprise a recess (not shown) or a groove formed on an upper surface of the support portion 421 and coupled to the protrusion 417 of the diffuser lens 410. The recess of the diffuser ring 420 and the protrusion 417 of the diffuser lens 410 may have shapes corresponding to each other. However, the depth of the recess of the diffuser ring 420 may be deeper than the height of the protrusion 417 of the diffuser lens 410. The adhesive may be disposed in a space formed by a difference between the depth of the recess and the height of the protrusion 417.

The diffuser ring 420 may comprise a ring portion 422. The ring portion 422 may be protruded from the outer circumference of the support portion 421. In the present embodiment, the size in the horizontal direction of the ring portion 422 of the diffuser ring 420 may be larger than the size in the corresponding direction of the lower end of the barrel portion 320. Through this, the lower end of the barrel portion 320 may function as a stopping protrusion with respect to the upper surface of the ring portion 422 of the diffuser ring 420. The ring portion 422 may be fixed to the holder 300 by an adhesive. The ring portion 422 may comprise a flat surface. The plane of the ring portion 422 may be in surface contact with the protrusion 315.

The diffuser ring 420 may comprise a protruding portion 423. The protruding portion 423 may be a gate protruding portion. However, the protruding portion 423 may be a protrusion irrelevant to the gate. The protruding portion 423 may be generated in a process of injection molding the diffuser ring 420. The protruding portion 423 may be disposed in the groove 316 of the holder 300. The protruding portion 423 may comprise a protrusion. The protruding portion 423 may be protruded from the side surface of the ring portion 422 toward the side direction. The protruding portion 423 may be protruded from the upper surface of the ring portion 422 toward the upward direction.

The diffuser ring 420 may comprise a protrusion 424. The protrusion 424 may be formed on an upper surface of the ring portion 422. The protrusion 424 may be spaced apart from the upper surface or the ceiling surface of the holder 300. However, in the modified embodiment, the protrusion 424 may function as an assembly reference surface by being contacted with an upper surface or a ceiling surface of the holder 300.

In the present embodiment, the protruding portion 414 of the diffuser lens 410 and the protruding portion 414 of the diffuser ring 420 may be disposed to correspond to each other in a vertical direction. Also, the holder 300 may comprise corresponding grooves 316 and 323. Through this, erroneous insertion of the diffuser lens 410 and the diffuser ring 420 in the wrong direction may be inhibited.

In a modified embodiment, the camera module may comprise a diffuser lens 400a that replaces the diffuser lens module 400. The diffuser lens 400a of the modified embodiment may have a form in which the diffuser lens 410 and the diffuser ring 420 of the present embodiment are integrally formed. However, a shape of a portion of the diffuser lens 400a of the modified embodiment may be different from the shape of a portion of the diffuser lens 410 and the diffuser ring 420 of the present embodiment. The diffuser lens 400a may be a plastic injection product. The diffuser lens 400a may be formed by plastic injection.

The diffuser lens 400a may comprise a lens portion 410a. The lens portion 410a of the modified embodiment may correspond to the lens portion 411 of the present embodiment. The diffuser lens 400a may comprise a flange portion 420a. The flange portion 420a of the modified embodiment may correspond to the flange portion 412 of the present embodiment and the support portion 421 of the diffuser ring 420. The diffuser lens 400a may comprise a ring portion 430a. The ring portion 430a of the modified embodiment may correspond to the ring portion 422 of the present embodiment. The diffuser lens 400a may comprise a protrusion 440a. The protrusion 440a may be a gate generated in the process of injection molding the diffuser lens 400a. In the present embodiment, a gate protrusion generated by injection molding is formed on each of the diffuser lens 410 and the diffuser ring 420, but only one gate protrusion may be formed in the modified embodiment. The diffuser lens 400a may comprise a protrusion 450a. The protrusion 450a may be formed on an upper surface of the ring portion 430a. The angle of the inclined surface of the flange portion 420a may be steeper than the angle of the inclined surface of the barrel 710. The protrusion 450a may function as an assembly reference surface by being contacted with an upper surface or a ceiling surface of the holder 300.

Compared with the present embodiment, the modified embodiment has an advantage that the process is simple and the manufacturing cost can be lowered. However, the present embodiment has an advantage of having a better moldability of the diffuser lens formed by plastic injection compared to the modified embodiment. In particular, in the case of the present embodiment, there is an advantage in that the shrinkage ratio is almost the same in the x-axis direction and the y-axis direction.

The camera module may comprise a shield can 500. The shield can 500 may cover the body 310 of the holder 300. The shield can 500 may comprise a cover. The shield can 500 may comprise a cover can. The shield can 500 may be a non-magnetic material. The shield can 500 may be formed of a metal material. The shield can 500 may be formed of a metal plate. The shield can 500 may be electrically connected to the substrate 100. The shield can 500 may be connected to the substrate 100 through a solder ball 540. Through this, the shield can 500 may be grounded. The shield can 500 may block electromagnetic interference (EMI). In this case, the shield can 500 may be referred to as 'EMI shield can'. In the present embodiment, as a high voltage is used inside the optical device, the electromagnetic interference noise may increase. The shield can 500 may block the electromagnetic interference noise.

The shield can 500 may comprise an upper plate 510 and a side plate 520. The shield can 500 may comprise an upper plate 510 and a side plate 520 being downwardly extended from the upper plate 510. The shield can 500 may comprise an upper plate 510 disposed on the holder 300, and a side plate 520 being downwardly extended from an outer circumference or an edge of the upper plate 510. The upper plate 510 of the shield can 500 may comprise a hole or an opening. The upper plate 510 of the shield can 500 may comprise a first hole corresponding to the diffuser lens 410 and a second hole corresponding to the lens 700. The upper plate 510 may be disposed at the same height at the first opening side of the holder 300 and the second opening side of the holder 300. The side plate 520 of the shield can 500 may be fixed to the holder 300. The lower end of the side plate 520 of the shield can 500 may be disposed on the step portion 313 of the holder 300. The lower end of the side plate 520 of the shield can 500 may be spaced apart from the step portion 313 of the holder 300. The inner surface of the side plate 520 of the shield can 500 may be fixed to the holder 300 by an adhesive.

The shield can 500 may comprise a coupling portion 530. The coupling portion 530 may be a ground terminal. The shield can 500 may comprise a coupling portion 530 formed by cutting a portion of the side plate 520. The coupling portion 530 may be integrally formed with the side plate 520 and the upper plate 510. The coupling portion 530 may be electrically connected to the substrate 100 and the solder ball 540. The lower end of the coupling portion 530 may be extended below the lower end of the side plate 520 of the shield can 500. The coupling portion 530 may be disposed to be inclined inward with respect to the side plate 520. The coupling portion 530 may comprise a plurality of coupling portions. The coupling portion 530 may comprise two coupling portions. The two coupling portion 530 may be biased toward the corner side of the shield can 500 and may be disposed opposite to each other.

The camera module may comprise a sensor 600. The sensor 600 may be disposed on the substrate 100. The sensor 600 may be disposed on the other side of the partition wall 340 of the holder 300 on the substrate 100. That is, the sensor 600 may be disposed on the opposite side of the light source 200 with respect to the partition wall 340 of the holder 300. The sensor 600 may detect infrared rays. The sensor 600 may detect light of a specific wavelength among infrared rays. The sensor 600 may detect light passing through the filter 800. The sensor 600 may detect light in the wavelength band of the light source 200. Through this, the sensor 600 senses light emitted from the light source 200 and reflected on the subject to sense 3D image information of the subject. The effective sensing area of the sensor 600 is disposed to correspond to the diffuser lens 410, but the sensor 600 may be disposed to be biased toward the partition wall 340 as a whole. A circuit pattern of the sensor 600 or the like may be disposed in a portion of the sensor 600 that is biased toward the partition wall 340.

The sensor 600 may comprise an effective sensing area. The sensor 600 may have a rectangular shape that is long in a first direction and short in a second direction perpendicular to the first direction. At this time, the effective sensing area may have a rectangular shape that is long in the second direction and short in the first direction. The effective sensing area of the sensor 600 may comprise a long side and a short side. In this case, the curvature of the micro lens may have a small curvature in a direction corresponding to a long side of the effective sensing area of the sensor 600 and a large curvature in a direction corresponding to a short side of the effective sensing area of the sensor 600. The surface of the micro lens may be formed steeply in a direction having a small curvature and smoothly formed in a direction having a large curvature. In the present embodiment, the micro lens may have a small curvature in a direction from the center toward the protruding portion 423 and a large curvature in a direction perpendicular to the direction toward the protruding portion 423.

The camera module may comprise a lens 700. The lens 700 may be fixed within the barrel 710. The lens 700 may be a plastic injection product. The lens 700 may be formed by plastic injection. The lens 700 may comprise a plurality of lenses. The lens 700 may comprise a total of 5 or 6 lenses. The lens 700 may comprise first to fifth lenses 701, 702, 703, 704, and 705.

The camera module may comprise a barrel 710. A thread 711 may be formed in the barrel 710. The barrel 710 may be screw-coupled to the holder 300. The barrel 710 may comprise a groove 712 formed on an upper surface of the barrel 710. The barrel 710 may comprise a step 713 formed on the outer circumferential surface of the barrel 710. The barrel 710 may comprise a groove 714 formed in an outer circumferential surface of the barrel 710. The barrel 710 may comprise a curved surface 715 formed below the thread 711 on the outer circumferential surface of the barrel 710.

The camera module may comprise a filter 800. The filter 800 may be disposed between the lens 700 and the sensor 600. The filter 800 may be a band pass filter that passes light of a specific wavelength band. The filter 800 may pass infrared rays. The filter 800 may pass light of a specific wavelength among infrared rays. The filter 800 may pass light in a wavelength band of light emitted by the light source 200. The filter 800 may block visible light. The filter 800 may be coupled to the holder 300. A groove having a size corresponding to the filter 800 is formed in the holder 300, and the filter 800 may be inserted into the groove and fixed with an adhesive. An adhesive injection groove for injecting an adhesive between the filter 800 and the holder 300 may be formed together in the groove of the holder 300. The filter 800 may be disposed at a position lower than the position of the diffuser ring 420.

The camera module may comprise an FPCB 910. The FPCB 910 may connect the substrate 100 and the connector 920. The camera module may comprise a connector 920. The connector 920 may be connected to an external component of the optical device.

The adhesives described in the present and modified embodiments may comprise epoxy.

The camera module can be packaged to be delivered in an assembled state. That is, a packaging member (protection member) for inhibiting damage to the optical device may be additionally provided. In the present embodiment, the packaging member cab 940 and tape 930 may be removed during installation in an optical apparatus.

The camera module may comprise a cab 940. The cab 940 may cover all configurations of the diffuser lens 410 and the lens 700 comprising the holder 300 and the shield can 500. Through this, it is possible to inhibit a phenomenon in which the protruding barrel portion 320 and the like is damaged.

The camera module may comprise a tape 930. The tape 930 may be disposed on an upper surface of the cab 940. The tape 930 may inhibit foreign substances from penetrating into the optical device through the hole of the cab 940.

Hereinafter, the assembly process of a camera module according to the present embodiment will be described.

First, the barrel 710 to which the diffuser lens 410 and the lens 700 are coupled is coupled to the holder 300. Thereafter, the shield can 500 is coupled to the holder 300 by an adhesive. Thereafter, an adhesive is applied between the diffuser lens 410 and the holder 300. Thereafter, the diffuser ring 420 is inserted into the holder 300 and an adhesive is applied between the diffuser ring 420 and the holder 300. Thereafter, the filter 800 is coupled to the holder 300 by an adhesive. Through this, the housing assembly is completed.

Meanwhile, the substrate 100, the FPCB 910, and the connector 920 are integrally prepared in an RFPCB state. Thereafter, the VCSEL as the light source 200 is adhered to the upper surface of the substrate 100. Thereafter, the sensor 600 is coupled to the upper surface of the substrate 100 by being spaced apart from the light source 200. Thereafter, wire bonding is performed between the substrate 100 and the sensor 600. Thereafter, the housing assembly assembled above is mounted on the upper surface of the substrate 100. Thereafter, auto soldering is performed on the coupling portion 530 of the shield can 500 and the substrate 100. Thereafter, the lens 700 is rotated according to the screw thread to focus (auto focusing). Thereafter, when the focusing is obtained, an adhesive is applied between the lens 700 and the holder 300. Thereafter, the setting of the light source 200 is adjusted through the Tx Tester. Thereafter, the light emitting module and the light receiving module are operated together to calibrate and adjust settings.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:
1. A light emitting module comprising:
a substrate;
a light source disposed above the substrate and emitting laser light;
a holder disposed above the substrate;
a diffuser lens disposed in the holder and disposed above the light source; and
a diffuser ring disposed between the diffuser lens and the light source,
wherein the diffuser lens comprises a plurality of micro lenses, and
wherein the holder comprise an opening formed above the diffuser lens and a stopping protrusion configured to inhibit the diffuser lens from being separated through the opening.
2. The light emitting module of claim 1, wherein an upper surface of the diffuser lens is greater in size than a size of the opening.
3. The light emitting module of claim 1, wherein at least a portion of the opening is defined by at least a portion of the stopping protrusion.
4. The light emitting module of claim 1, wherein the diffuser ring comprises a support portion contacting with a lower portion of the diffuser lens and a ring portion protruding from an outer periphery of the support portion.
5. The light emitting module of claim 4, wherein the diffuser lens comprises a lens portion and a flange portion disposed on an outer periphery of the lens portion.
6. The light emitting module of claim 5, wherein the diffuser lens comprises a protrusion protruding from a portion of a lower surface of the flange portion.
7. The light emitting module of claim 6, wherein the protrusion has a ring shape.
8. The light emitting module of claim 6, wherein a gap is formed in at least a portion between the diffuser lens and the diffuser ring by the protrusion.
9. The light emitting module of claim 6, wherein the protrusion is formed adjacent to an inner peripheral surface than an outer peripheral surface of the flange portion.
10. The light emitting module of claim 1, wherein a portion of the diffuser lens is disposed between the diffuser ring and the stopping protrusion of the holder in a vertical direction.
11. The light emitting module of claim 1, wherein the diffuser lens comprises a protruding portion protruding from an outer peripheral surface of the diffuser lens, and
wherein the holder comprises a first groove accommodating at least a portion of the protruding portion of the diffuser lens.
12. The light emitting module of claim 11, wherein the diffuser ring comprises a protruding portion protruding from an outer peripheral surface of the diffuser ring, and
wherein the holder comprises a second groove accommodating at least a portion of the protruding portion of the diffuser ring.
13. The light emitting module of claim 12, wherein at least a portion of the protruding portion of the diffuser ring is overlapped with the protruding portion of the diffuser lens in a vertical direction.
14. A camera module comprising:
the light emitting module of claim 1;
a sensor disposed on the substrate; and
a lens coupled with the holder and disposed above the sensor,
wherein the holder comprises a partition wall, and
wherein the light source is disposed at one side of the partition wall and the sensor is disposed at an other side of the partition wall.
15. An optical apparatus comprising:
a main body;
the camera module of claim 14, disposed on the main body; and a display disposed on the main body outputting an information captured by the camera module.
16. A camera module comprising:
a substrate;
a holder comprising a partition wall and disposed above the substrate;
a light source disposed at one side of the partition wall above the substrate and emitting laser light;
a sensor disposed above the substrate at the other side of the partition wall;
a lens coupled to the holder and disposed above the sensor;
a diffuser lens coupled to the holder and disposed above the light source; and
a diffuser ring disposed between the diffuser lens and the light source,
wherein the diffuser lens comprises a plurality of micro lenses, and
wherein the holder comprises an opening formed above the diffuser lens and a stopping protrusion configured to inhibit the diffuser lens from being separated through the opening.
17. The camera module of claim 16, wherein a portion of the diffuser lens is disposed between the diffuser ring and the stopping protrusion of the holder in a vertical direction.
18. The camera module of claim 16, wherein the diffuser ring comprises a support portion contacting with a lower portion of the diffuser lens and a ring portion protruding from an outer periphery of the support portion, and
wherein the diffuser lens comprises a lens portion, a flange portion disposed on an outer periphery of the lens portion, and a protrusion protruding from a portion of a lower surface of the flange portion.
19. The camera module of claim 16, wherein the diffuser lens comprises a protruding portion protruding from an outer peripheral surface of the diffuser lens,
wherein the diffuser ring comprises a protruding portion protruding from an outer peripheral surface of the diffuser ring, and wherein at least a portion of the protruding portion of the diffuser ring is overlapped with the protruding portion of the diffuser lens in a vertical direction.

20. A light emitting module comprising:
a substrate;
a light source disposed above the substrate and emitting laser light:
a holder disposed above the substrate;
a diffuser lens disposed in the holder and disposed above the light source; and
a diffuser ring disposed between the diffuser lens and the light source,
wherein the diffuser lens comprises a plurality of micro lenses, and
wherein a portion of the diffuser lens is disposed between the diffuser ring and a stopping protrusion of the holder in a vertical direction.

* * * * *